United States Patent [19]

Shimei et al.

[11] Patent Number: 5,443,595
[45] Date of Patent: Aug. 22, 1995

[54] CONTROL APPARATUS FOR AUTOMATIC TRANSMISSION

[75] Inventors: Masato Shimei, Nagoya; Shigeki Goto, Kariya; Takahiro Sakai, Toyota; Masahiko Nakagawa, Nagoya, all of Japan

[73] Assignee: Aisin Seiki Kabishuki Kaisha, Kariya, Japan

[21] Appl. No.: 95,840

[22] Filed: Jul. 23, 1993

[30] Foreign Application Priority Data

Jul. 24, 1992 [JP] Japan .................................. 4-198470

[51] Int. Cl.6 ............................................. B60K 41/10
[52] U.S. Cl. ................................................... 477/155
[58] Field of Search ................................ 477/155, 154

[56] References Cited

U.S. PATENT DOCUMENTS

| | | | |
|---|---|---|---|
| 4,882,952 | 11/1989 | Kashihara et al. | 477/155 |
| 4,922,424 | 5/1990 | Hiramatsu | 477/155 |
| 5,003,842 | 4/1991 | Hatta et al. | 477/155 |
| 5,014,575 | 5/1991 | Fujiwara et al. | 477/155 |
| 5,046,384 | 9/1991 | Imamura | 477/155 |
| 5,058,461 | 10/1991 | Shimei | 477/155 |
| 5,075,858 | 12/1991 | Narita | 477/155 |

FOREIGN PATENT DOCUMENTS

3-117766  5/1991  Japan .

*Primary Examiner*—Dirk Wright
*Attorney, Agent, or Firm*—Burns, Doane, Swecker & Mathis

[57] ABSTRACT

A control apparatus for an automatic transmission having a set of frictional engagement elements arranged to be selectively engaged or disengaged in shift-up operation of the transmission, and a shift timing valve arranged to be switched over by hydraulic pilot pressure applied there-to under control of a solenoid valve for switching over discharge of fluid under pressure from one of the frictional engagement elements to be disengaged in the shift-up operation from a slow-drain condition to a quick-drain condition. The control apparatus is designed to detect a drive torque of a vehicle engine, to determine a timing period for energization of the solenoid valve in the shift-up operation in accordance with the drive torque of the vehicle engine, to maintain the solenoid valve in its deenergized condition during the timing period, and to energize the solenoid valve upon lapse of the timing period.

5 Claims, 9 Drawing Sheets

| MODE | | C0 | C1 | C2 | B0 | B1 | B2 |
|---|---|---|---|---|---|---|---|
| P | | ○ | | | | | |
| R | | ○ | | ○ | | | ○ |
| N | | ○ | | | | | |
| D | 1 | ○ | ○ | | | | |
| D | 2 | | ○ | | | ○ | |
| D | 3 | ○ | ○ | ○ | ○ | | |
| D | 4 | | ○ | ○ | | | |
| S | 1 | ○ | ○ | | | | |
| S | 2 | ○ | ○ | | | ○ | |
| S | 3 | ○ | ○ | ○ | | | |
| L | 1 | ○ | ○ | | | | ○ |
| L | 2 | ○ | ○ | | | ○ | |
| L | 3 | ○ | ○ | ○ | | | |

CONTROL APPARATUS FOR AUTOMATIC TRANSMISSION

BACKGROUND Of THE INVENTION

1. Field of The Invention

The present invention relates to a control appratus for an automatic transmission in automotive vehicles, and more particularly to a, control apparatus for an automatic transmission which includes a plurality of frictional engagement elements arranged to be selectively engaged or disengaged for effecting a change in speed of the transmission.

2. Description of the Prior Art

In Japanese Patent Laid-open Publication No. 3-117766, there has been proposed a control apparatus for an automatic transmission of the type which includes a set of frictional engagement elements arranged to be selectively engaged or disengaged in shift-up operation. In the control apparatus, a shift timing valve is adapted to control fluid under pressure discharged from one of the frictional engagement elements to be disengaged in shift-up operation. The shift timing valve is designed to be switched over when a resultant force of hydraulic pressure applied thereto from the other fictional engagement element to be engaged and pilot pressure applied thereto under control of a solenoid valve becomes larger than that of modulated accumulator back pressure applied thereto in accordance with throttle pressure from a throttle valve and a biasing force of a return spring assembled therein. When the shift timing valve is switched over, it acts to switch over discharge of the fluid under pressure from a slow-drain condition to a quick-drain condition.

In the control apparatus described above, the operation of the solenoid valve is controlled on a basis of a change-speed map wherein a boundary line indicative of an opening degree of an engine throttle in relation to the vehicle speed is determined in a higher speed region than that defined by a shift diagram. In the change-speed map, an overlap region is defined between the boundary line and the shift diagram, and an underlap region is defined in a higher speed region than that defined by the boundary line. When a coordinate defined by the opening degree of the engine throttle and the vehicle speed in shift-up operation is in the overlap region of the map, the solenoid valve is opened to permit release of the pilot pressure from the shift timing valve. When the coordinate is in the underlap region, the solenoid valve is closed to apply the pilot pressure to the shift timing valve.

Under control of the control apparatus, the opening degree of the engine throttle and the vehicle speed are adapted as parameter for selecting the overlap control or the underlap control in shift-up operation of the transmission. This is effective to select a condition for change-speed in accordance with a travelling condition of the vehicle thereby to reduce unpleasant shocks in shift-up operation of the transmission. However, an optimal condition for change-speed may not be obtained since the overlap or underlap control is alternatively selected to select the condition of charge-speed.

SUMMARY OF THE INVENTION

It is, therefore, a primary object of the present invention to provide an improved control apparatus for an automatic transmission capable of more properly controlling the solenoid valve in accordance with a drive torque of the vehicle engine thereby to continuously control the operation timing of the shift timing valve for improvement of the shift feeling.

According to the present invention, there is provided a control apparatus for an automatic transmission having a set of frictional engagement elements arranged to be selectively engaged or disengaged in shift-up operation of the transmission, and a shift timing valve arranged to be switched over by hydraulic pilot pressure applied thereto under control of a solenoid valve for switching over discharge of fluid under pressure from one of the frictional engagement elements to be disengaged in the shift-up operation from a slow-drain condition to a quick-drain condition, which control apparatus comprises detection means for detecting a drive torque of a vehicle engine, means for determining a timing period for energization of said solenoid valve in the shift-up operation in accordance with the drive torque of 1,he vehicle engine, and means for maintaining said solenoid valve in its deenergized condition during the timing period and for energizing said solenoid valve upon lapse of the timing period.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENTS

Figure 2:
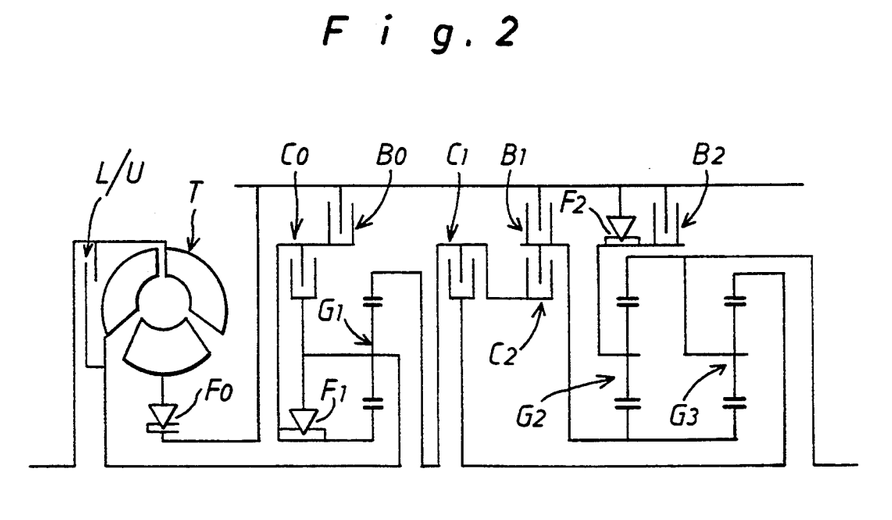
FIG. 2 is a schematic illustration of gear trains in the automatic transmission shown in FIG. 1.

Referring now to the drawings, FIG. 2 schematically illustrates gear trains in a 4-speed automatic transmission equipped with a lock-up mechanism. The automatic transmission includes a torque converter T, planetary gear sets $G_1$, $G_2$, $G_3$, a hydraulic lock-up clutch L/U, hydraulic clutches $C_0$, $C_1$, $C_2$, hydraulic brakes $B_0$, $B_1$, $B_2$ and one-way clutches $F_0$, $F_1$, $F_2$.

Figure 3:
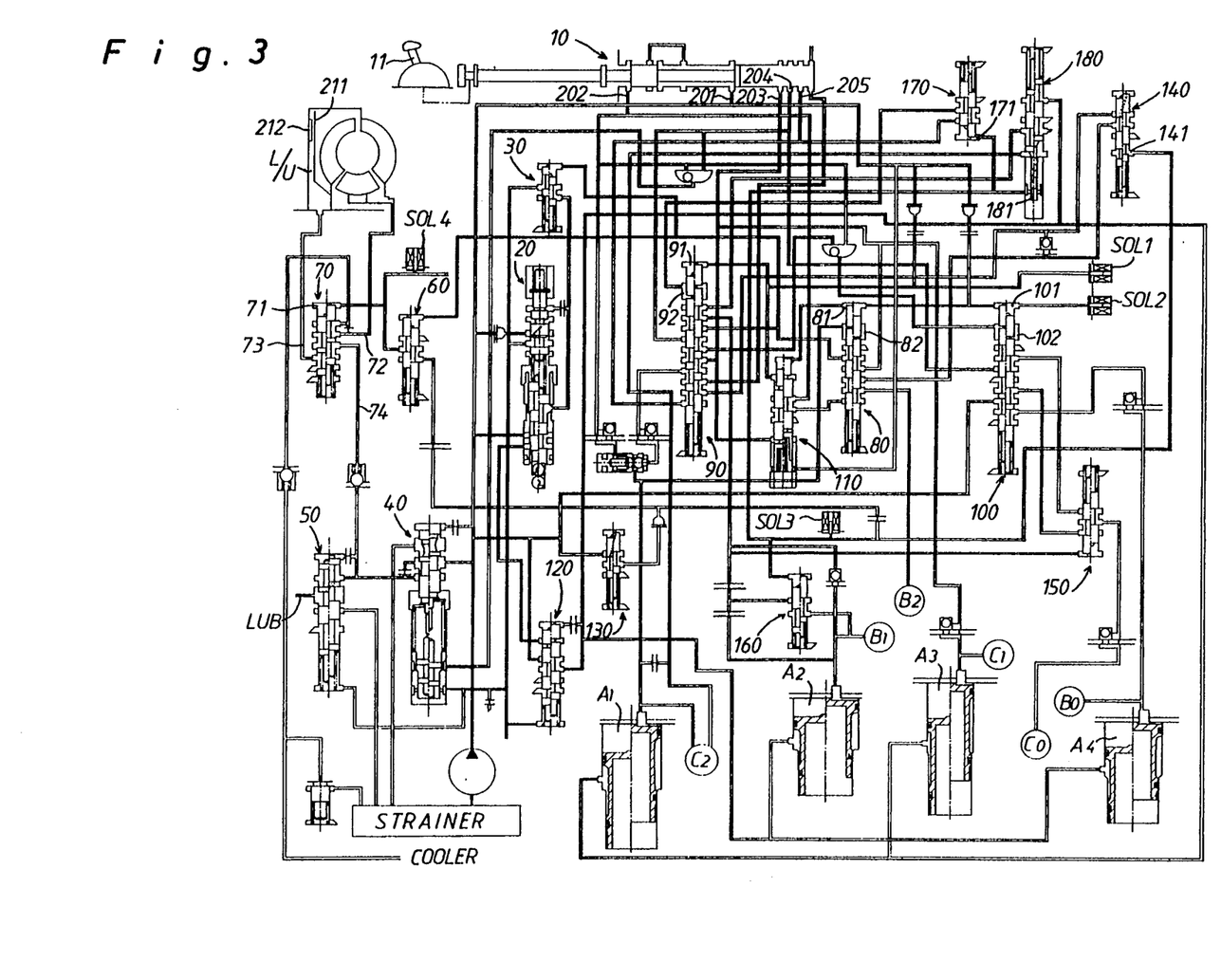
FIG. 3 is a diagram of a hydraulic control apparatus for the automatic transmission shown in FIG. 1.

In FIG. 3, there is illustrated a hydraulic control apparatus for controlling the hydraulic clutches L/U, $C_0$, $C_1$, $C_2$ and brakes $B_0$, $B_1$, $B_2$. The hydraulic control apparatus includes a manual shift valve 10 to be shifted by operation of a shift lever 11, a throttle valve 20 to be operated by depression of an accelerator pedal of an automotive vehicle (not shown), a cut-off valve 30 to be operated in accordance with hydraulic pressure applied to its pilot chambers, a primary regulator valve 40, a secondary regulator valve 50, a lock-up signal valve 60, a lock-up control valve 70, a 1-2 shift valve 80, a 2-3 shift valve 90, a 3-4 shift valve 100 and a reverse control valve 110. The hydraulic control apparatus further includes an accumulator control valve 120, a modulator valve 130, a low-coast modulator valve 140, a CO exhaust valve 150, an orifice control valve 160, a low-inhibit valve 170, a 2-3 shift timing valve 180, accumulators $A_1$-$A_4$ and solenoid valves $SOL_1$, $SOL_2$, $SOL_3$, $SOL_4$ to be energized under control of an electronic control apparatus ECU in the form of a commercially available microcomputer. The above-described valves and accumulators are connected to the hydraulic clutches L/U, $C_0$, $C_1$, $C_2$ and brakes $B_0$, $B_1$, $B_2$, respectively, as shown in FIG. 3.

Figure 1:
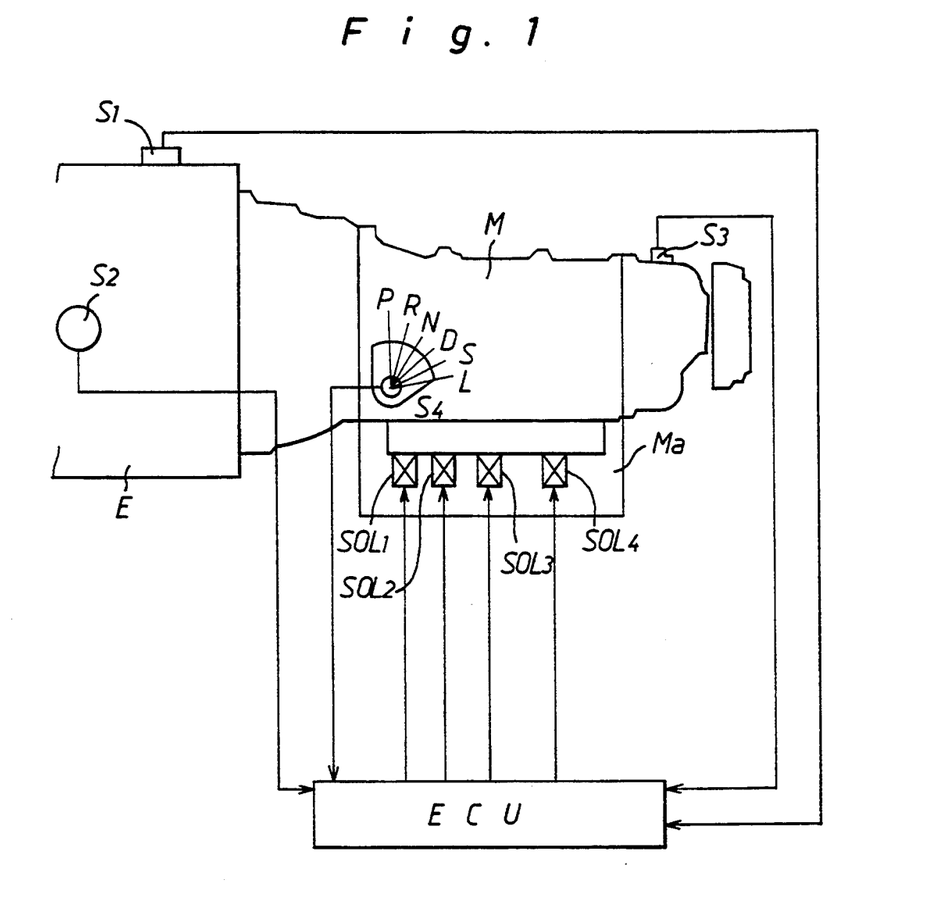
FIG. 1 is a schematic illustration of an electronic control system adapted to an automatic transmission.

As shown in FIG. 1., the automatic transmission M is mounted to an internal combustion engine E which is provided with an engine rotation sensor $S_1$ for detecting a rotational speed of the engine E and a linear throttle sensor $S_2$ for detecting an opening degree of the engine throttle. The automatic transmission M is provided with a vehicle speed sensor $S_3$ for detecting a rotational speed of an output shaft of the transmission and a position sensor $S_4$ for detecting each shift position (P, R, N, D, S, L) of the shift lever 11. The solenoid valves $SOL_1$, $SOL_2$, $SOL_3$ and $SOL_4$ are mounted on the transmission housing to be activated under control of the electronic control apparatus ECU in response to electric signals from the sensors $S_1$-$S_4$.

Figure 4:
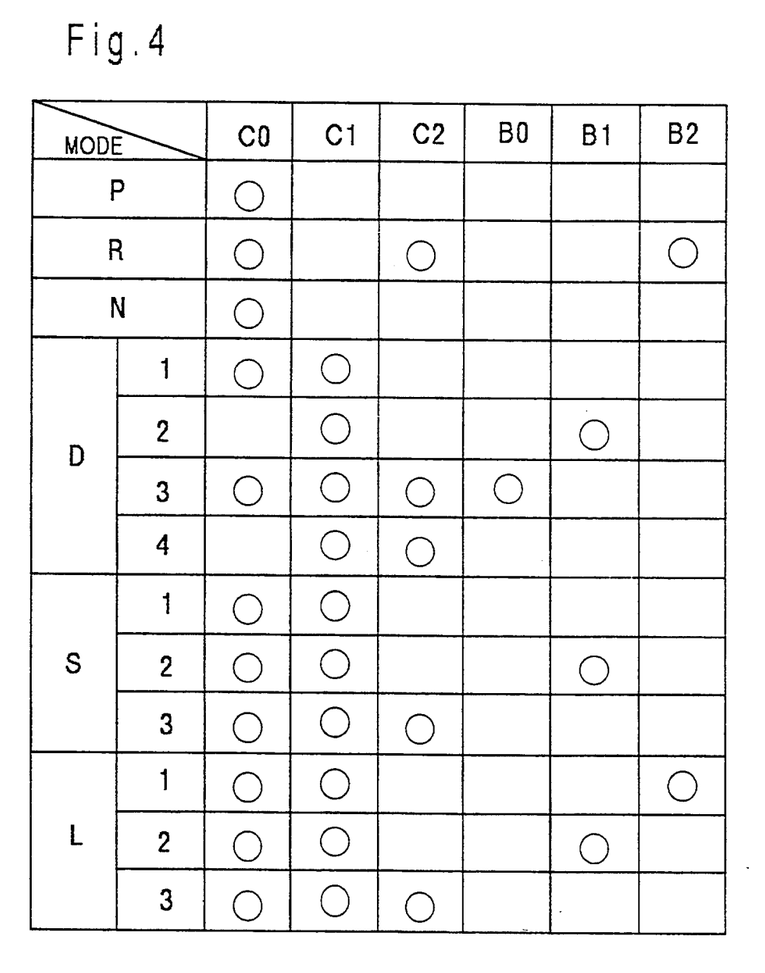
FIG. 4 is a table illustrating operative conditions of hydraulic clutches and brakes in relation to the mode of operation of the transmission.

Assuming that the shift lever 11 has been shifted to the "P" position to shift the manual shift valve 10 to a "P" range, the shifting operation of shift lever 11 is detected by the position sensor $S_4$, and the electronic control apparatus ECU acts to energize the solenoid valves $SOL_1$, $SOL_2$ in response to an electric signal from sensor $S_4$ and to deenergize the solenoid valve $SOL_3$ in response to the electric signal. In this instance, the solenoid valves $SOL_1$, $SOL_2$ are closed, while the solenoid valve $SOL_3$ is opened. Thus, the manual shift valve 10 is positioned to disconnect an R-range circuit 202, a D-range circuit 203, a S-range circuit 204 and an L-range circuit 205 from a line-pressure circuit 201 and connect them to a fluid reservoir. Accordingly, the hydraulic clutch $C_1$ in connection to the D-range circuit 203 is connected to the fluid reservoir through the manual shift valve 10, the hydraulic clutch $C_2$ is connected to the fluid reservoir through the 2-3 shift valve 90 and manual shift valve 10 or the R-range circuit 202 and manual shift valve 10, the hydraulic brake $B_0$ is connected to the fluid reservoir through the 3-4 shift valve 100, the hydraulic brake $B_1$ is connected to the fluid reservoir through the 2-3 shift valve 90, the 1-2 shift valve 80, the D-range circuit 203 and manual shift valve 10, and the hydraulic brake $B_2$ is connected to the fluid reservoir through the 1-2 shift valve 80 and reverse control valve 110. In such a condition as described above, the 3-4 shift valve 100 is operated by the hydraulic pressure applied to its upper pilot chamber 101 to connect the line-pressure circuit 201 to the hydraulic clutch $C_0$ through the CO-exhaust valve 150 thereby to establish a P-range circuit. Thus, the gear trains of the transmission are maintained in a neutral condition. In FIG. 4, there is illustrated the P-range mode of the transmission where the activated condition of the hydraulic clutch $C_0$ is indicated with a circle.

When the shift lever 11 is shifted to the R-position to shift the manual shift valve 10 to an "R" range, the shifting operation of the shift lever 11 is detected by the position sensor $S_4$, and the electronic control apparatus ECU acts to energize the solenoid valve $SOL_2$ in response to an electric signal from sensor $S_4$ and to deenergize the solenoid valves $SOL_1$, $SOL_3$ in response to the electric signal. In this instance, the solenoid valve $SOL_2$ is closed, while the solenoid valves $SOL_1$, $SOL_3$ are opened. Thus, the manual shift valve 10 is positioned to connect the line-pressure circuit 201 to the R-range circuit 202 and to connect the D-range circuit 203, S-range circuit 204 and L-range circuit 205 to the fluid reservoir. Accordingly, the hydraulic clutch $C_1$ and brake $B_0$ are connected to the fluid reservoir, and the hydraulic brake $B_1$ is connected to the fluid reservoir through the 2-3 shift valve 90 and 2-3 shift timing valve 180. Also, the line-pressure circuit 201 in connection to the manual shift valve 10 is connected to the hydraulic brake $B_2$ through the R-range circuit 202, reverse control valve 110 and 1-2 shift valve 80 and to the hydraulic clutch $C_2$ through the R-range circuit 202, and the line-pressure circuit 201 in connection to the 3-4 shift valve 100 is connected to the hydraulic clutch $C_O$ through the 3-4 shift valve 100 and CO-exhaust valve 150. Thus, the hydraulic clutches $C_0$, $C_2$ and brake $B_2$ are engaged as shown by circles in FIG. 4, while the hydraulic clutch $C_1$ and brakes $B_0$, $B_1$ are disengaged. This establishes a reverse gear train in the transmission M.

When the shift lever 11 is shifted to the N-position to shift the manual shift valve 10 to an N-range, the shifting operation of shift lever 11 is detected by the position sensor $S_4$, and the electronic control apparatus ECU acts to energize the solenoid valves $SOL_1$, $SOL_2$ in response to an electric signal from sensor $S_4$ and to deenergize the solenoid valve $SOL_3$. In this instance, the solenoid valves $SOL_1$, $SOL_2$ are closed, while the solenoid valve $SOL_3$ is opened. Thus, the manual shift valve 10 is positioned to disconnect the R-range circuit 202, D-range circuit 203, S-range circuit 204 and L-range circuit 205 from the line-pressure circuit 201 and connect them to the fluid reservoir. Accordingly, the hydraulic clutches $C_1$, $C_2$ and brakes $B_0$, $B_1$, $B_2$ are connected to the fluid reservoir as in the P-range circuit, while the line-pressure circuit 201 in connection to the 3-4 shift valve 100 is connected to the hydraulic clutch $C_O$ through the 3-4 shift valve 100 and CO-exhaust valve 150. Thus, only the hydraulic clutch $C_O$ is engaged as shown by a circle in FIG. 4, while the hydraulic clutches $C_1$, $C_2$ and brakes $B_0$, $B_1$, $B_2$ are disengaged. As a result, the gear trains in the transmission are maintained in a neutral condition.

When the shift lever 11 is shifted to the "D" position to shift the manual shift valve 10 to a D-range, the shifting operation of lever 11 is detected by the position sensor $S_4$, and the electronic control apparatus ECU acts to energize or deenergize the solenoid valves $SOL_1$-$SOL_3$ in accordance with a vehicle speed and an opening degree of the engine throttle respectively detected by the speed sensor $S_3$ and linear throttle sensor $S_2$ as will be described hereinafter. In this instance, the manual shift valve 10 is positioned to connect the line-pressure circuit 201 to the D-range circuit 203 and to connect the R-range circuit 202, S-range circuit 204 and L-range circuit 205 to the fluid reservoir.

When a first speed region, is determined the electronic control apparatus ECU acts to energize the solenoid valve $SOL_1$ and to deenergize the solenoid valves $SOL_2$, $SOL_3$. In this instance, the solenoid valve $SOL_1$ is closed, while the solenoid valves $SOL_2$, $SOL_3$ are opened. Thus, the 2-3 shift valve 90 is shifted by the pilot pressure applied to its upper pilot chamber 91, and the 3-4 shift valve 100 is shifted by the line-pressure applied to its lower pilot chamber 102 through the D-range circuit 203 and 2-3 shift valve 90. Accordingly, the hydraulic clutch $C_2$ is connected to the fluid reservoir through the 2-3 shift valve 90 and manual shift valve 10 or the R-range circuit 202 and manual shift valve 10, the hydraulic brake $B_0$ is connected to the fluid reservoir through the 3-4 shift valve 100, the hydraulic brake $B_1$ is connected to the fluid reservoir through the 2-3 shift valve 90 and 1-2 shift valve 80, the hydraulic brake $B_2$ is connected to the fluid reservoir through the 1-2 shift valve 80, 2-3 shift valve 90, the L-range circuit 205 and manual shift valve 10, the line-pressure circuit 201 in connection to the 3-4 shift valve 100 is connected to the hydraulic clutch $C_O$ through the 3-4 shift valve 100 and CO exhaust valve 150, and the hydraulic clutch $C_1$ in connection to the D-range circuit 203 is connected to the line-pressure circuit 201 through the manual shift valve 10 to establish a D1-range circuit. In this instance, the hydraulic clutches $C_0$, $C_1$, $C_2$ and brakes $B_0$, $B_1$, $B_2$ are conditioned as shown at a D1-range mode in FIG. 4. This establishes a first speed gear train at the D-range of the transmission M.

When a second speed region is detected, the electronic control apparatus ECU acts to energize the solenoid valves $SOL_1$, $SOL_2$ and to deenergize the solenoid valve $SOL_3$. In this instance, the solenoid valves $SOL_1$, $SOL_2$ are closed, while the solenoid valve $SOL_3$ is opened. Thus, the 1-2 shift valve 80, 2-3 shift valve 90 and 3-4 shift valve 100 are shifted by the pilot pressure applied to their pilot chambers 81, 91, 101. Accordingly, the hydraulic clutch $C_1$ in connection to the D-range circuit 203 is connected to the line-pressure circuit 201 through the manual shift valve 10, the hydraulic brake $B_1$ is connected to the line-pressure circuit 201 through the 2-3 shift valve, 1-2 shift valve 80, D-range circuit 203 and manual shift valve 10. As a result, the CO-exhaust valve 150 is operated by the hydraulic pressure applied thereto from the hydraulic brake $B_1$, and the reverse control valve 110 is operated by the hydraulic pressure applied thereto from the line-pressure circuit 201 and D-range circuit 203 in the same direction as the biasing force one a spring assembled therein. Thus, the hydraulic clutch $C_O$ is connected to the fluid reservoir through the CO-exhaust valve 150, 3-4 shift valve 100, S-range circuit 204 and manual shift valve 10, the hydraulic clutch $C_2$ is connected to the fluid reservoir through the 2-3 shift valve 90 and manual valve 10 or R-range circuit 202 and manual shift valve 10, the hydraulic brake $B_0$ is connected to the fluid reservoir through the 3-4 shift valve 100, and the hydraulic brake $B_2$ is connected to the fluid reservoir through the 1-2 shift valve 80, reverse control valve 110, R-range circuit 202 and manual shift valve 10 to establish a D2-range circuit. In this instance, the hydraulic clutches $C_0$, $C_1$, $C_2$ and brakes $B_0$, $B_1$, $B_2$ are conditioned as shown at a D2-range mode in FIG. 4. This establishes a second speed gear train at the D-range of the transmission M.

When detected a third speed range is detected, the electronic control apparatus ECU acts to energize the solenoid valve $SOL_2$ and to deenergize the solenoid valves $SOL_1$, $SOL_3$. In this instance, the solenoid valve $SOL_2$ is closed, while the solenoid valves $SOL_1$, $SOL_3$ are opened. Thus, the 1-2 shift valve 80 and 3-4 shift valve 100 are shifted by the pilot pressure applied to their pilot chambers 81,101, while the 2-3 shift valve 90 is made inoperative by release of the pilot pressure from its pilot chamber 91. Accordingly, the hydraulic brake $B_0$ is connected to the fluid reservoir through the 3-4 shift valve 100, and the hydraulic brake $B_1$ is connected to the fluid reservoir through the 2-3 shift valve 90 and 2-3 shirt timing valve 180. As a result, the reverse control valve 110 is operated by the hydraulic pressure applied thereto from the line-pressure circuit 201 and D-range circuit 203 in the same direction as that of the biasing force of a spring assembled therein. Thus, the hydraulic brake $B_2$ is connected to the fluid reservoir through the 1-2 shift valve 80, reverse control valve 110, R-range circuit 202 and manual valve 10, the hydraulic clutch $C_1$ in connection to the D-range circuit 203 is connected to the line-pressure circuit 201 through the manual shift valve 10, the hydraulic clutch $C_2$ is connected to the line-pressure circuit 201 through the 2-3 shift valve 90, D-range circuit 203 and manual shift valve 10, and the hydraulic clutch $C_0$ is connected to the line-pressure circuit 201 through the CO-exhaust valve 150 and 3-4 shift valve 100 to establish a D3-range circuit. In this instance, the hydraulic clutches $C_0$, $C_1$, $C_2$ and brake $B_0$, $B_1$, $B_2$ are conditioned as shown at a D3-range mode in FIG. 4. This establishes a third speed gear train at the D-range mode of the transmission M.

When determined a fourth speed range is determined, the electronic control apparatus ECU acts to energize the solenoid valve $SOL_3$ and to deenergize the solenoid valves $SOL_1$, $SOL_2$. In this instance, the solenoid valve $SOL_3$ is closed, while the solenoid valves $SOL_1$, $SOL_2$ are opened. Thus, the 2-3 shift valve 90 and 3-4 shift valve 100 are made inoperative, the low-coast modulator valve 140, orifice control valve 160, low inhibit valve 170 and 2-3 shift timing valve 180 are operated by the pilot pressure applied to their pilot chambers 141, 161, 171, 181, and the 1-2 shift valve 80 is operated by the pilot pressure applied to its pilot chamber 82 through the D-range circuit 203 and 2-3 shift valve 90. Accordingly, the hydraulic brake $B_1$ is connected to the fluid reservoir through the 2-3 shift valve 90 and 2-3 shift timing valve 180, the hydraulic brake $B_2$ is connected to the fluid reservoir through the 1-2 shift valve 80, reverse control valve 110, R-range circuit 202 and manual shift valve 10, the hydraulic clutch $C_O$ is connected to the fluid reservoir through the CO-exhaust valve 150 and 3-4 shift valve 100, the hydraulic clutch $C_1$ in connection to the D-range circuit 203 is connected to the line-pressure circuit 201-through the manual shift valve 10, the hydraulic clutch $C_2$ is connected to the line-pressure circuit 201 through the 2-3 shift valve 90, D-range circuit 203 and manual shift valve 10, and the hydraulic brake $B_0$ is connected to the line-pressure valve 201 through 3-4 shift valve 100 to establish a D4-range circuit. In this instance, the hydraulic clutches $C_0$, $C_1$, $C_2$ and brakes $B_0$, $B_1$, $B_2$ are conditioned as shown at a D4-range mode in FIG. 4. This establishes a fourth speed gear train at the D-range mode of the transmission M.

When the vehicle speed becomes higher than a predetermined speed during travel of the vehicle with the fourth speed gear train, the electronic control apparatus ECU acts to energize the solenoid valve $SOL_4$. In this instance, the solenoid valve $SOL_4$ is closed, and the the lock-up control valve 70 is operated by the modulated pressure applied to its pilot chamber 71 from the modulator valve 130 through the lock-up signal valve 60. Thus, the hydraulic pressure from the secondary regulator valve 50 is applied to the torque converter T through the lines 74, 72, while the line 73 is connected to the fluid reservoir. Accordingly, a lock-up piston 211 in torque converter T is engaged with a front cover 212 of torque converter T to engage the lock-up clutch L/U. When the vehicle speed becomes lower than the predetermined spewed, the electronic control apparatus ECU determines the fact that the transmission has been returned to the fourth speed range. Thus, the solenoid valve $SOL_4$ is deenergized under control of the electronic control apparatus ECU and is opened. In turn, the lock-up control valve 70 is made inoperative to apply the hydraulic pressure to the front of lock-up piston 211 through the line 73 and to discharge the fluid under pressure from the rear of lock-up piston 211 into an oil cooler (not shown). As a result, the lock-up piston 211 is moved backward to disengage the lock-up clutch L/U.

When the shift lever 11 is shifted to the S-position to shift the manual shift valve 10 to a S-range, the shifting operation of lever 11 is detected by the position sensor $S_4$, and the electronic control apparatus ECU acts to energize or deenergize the solenoid valves SOL1-SOL3 in accordance with the vehicle speed and the opening degree of the engine throttle as will be described hereinafter. In this instance, the manual shift valve 10 is positioned to connect the line-pressure circuit 201 to the D-range circuit 203 and S-range circuit 204 and to connect the R-range circuit 202 and L-range circuit 205 to the fluid reservoir.

When the transmission is in a first speed region at its S-range mode, the electronic control apparatus acts to energize the solenoid valve $SOL_1$ and to deenergize the solenoid valves $SOL_2$, $SOL_3$. In this instance, the solenoid valve $SOL_1$ is closed, while the solenoid valves $SOL_2$, $SOL_3$ are opened. Thus, the 2-3 shift valve 90 and 3-4 shift valves 100 are operated in the same manner as that in the D1-range mode described above, the hydraulic clutch $C_2$ and brakes $B_0$, $B_1$, $B_2$ are connected to the fluid reservoir in the same manner as in the D1-range mode, and the hydraulic clutches $C_0$, $C_1$ are connected to the line-pressure circuit 201 to establish a S1-range circuit. In this instance, the hydraulic clutches $C_0$, $C_1$, $C_2$ and brakes $B_0$, $B_1$, $B_2$ are conditioned as shown at a S1-range mode in FIG. 4. This establishes a first speed gear train at the S-range mode of the transmission M.

When the transmission is in a second speed region at its S-range mode, the electronic control apparatus ECU acts to energize the solenoid valves $SOL_1$, $SOL_2$ and to deenergize the solenoid valve $SOL_3$. In this instance, the solenoid valves $SOL_1$, $SOL_2$ are closed, while the solenoid valve $SOL_3$ is opened. Thus, the 1-2 shift valve 80, 2-3 shift valve 90 and 3-4 shift valve 100 are operated in the same manner as in the D2-range mode described above. Accordingly, the hydraulic clutch $C_1$ and brake $B_1$ are connected to the line-pressure circuit 201 in the same manner as in the D2-range mode, and the hydraulic clutch $C_O$ is connected to the line-pressure circuit 201 through the CO-exhaust valve 150, 3-4 shift valve 100, S-range circuit 204 and manual shift valve 10, and the hydraulic clutch $C_2$ and brakes $B_0$, $B_2$ are connected to the fluid reservoir to establish a S2-range circuit. Thus, the hydraulic clutches $C_0$, $C_1$, $C_2$ and brakes $B_0$, $B_1$, $B_2$ are conditioned as shown at a S2-range mode in FIG. 4. This establishes a second speed gear train at the S-range mode of the transmission M. In this instance, the hydraulic clutch $C_O$ is engaged to restrain free rotation of the one-way clutch $F_1$ for effecting the engine brake of the vehicle.

When the transmission is in a third speed region at its S-range mode, the electronic control apparatus ECU acts to energize the solenoid valve $SOL_2$ and to deenergize the solenoid valves $SOL_1$, $SOL_3$. In this instance the solenoid valve $SOL_2$ is closed, while the solenoid valves $SOL_1$, $SOL_3$ are opened. Thus, the 1-2 shift valve 80 and 3-4 shift valve 100 are shifted in the same manner as in the D3-range mode and the 2-3 shift valve is made inoperative. As a result, the hydraulic brakes $B_0$, $B_1$, $B_2$ are connected to the fluid reservoir in the same manner as in the D3-range mode, and the hydraulic clutches $C_0$, $C_1$, $C_2$ are connected to the line-pressure circuit 201 to establish a S3-range circuit. In this instance, the hydraulic clutches $C_0$, $C_1$, $C_2$ and brakes $B_0$, $B_1$, $B_2$ are conditioned as shown at a S3-range mode in FIG. 4. This establishes a third speed gear train at the S-range mode of the transmission M.

When the shift lever 11 is shifted to the L-position to shift the manual shift valve 10 to an L-range, the shifting operation of lever 11 is detected by the position sensor $S_4$, and the electronic control apparatus ECU acts to energize or deenergize the solenoid valves SOL1-SOL3 in accordance with the vehicle speed and the opening degree of the engine throttle as will be described hereinafter. In this instance, the manual shift valve 10 is positioned to connect the line-pressure circuit 201 to the D-range circuit 203, S-range circuit 204 and L-range circuit 205 and to connect the R-range circuit 202 to the fluid reservoir.

When the transmission is in a first speed region at its L-position, the electronic control apparatus ECU acts to energize the solenoid valve $SOL_1$ and to deenergize the solenoid valves $SOL_2$, $SOL_3$. In this instance, the solenoid valve SOL is closed, while the solenoid valves $SOL_2$, $SOL_3$ are opened. Thus, the 2-3 shift valve 90 and 3-4 shift valve 100 are shifted in the same manner as in D1-range mode or S1-range mode. In this instance, the 2-3 shift valve 90 is shifted by the pilot pressure applied to its lower pilot chamber 92 from the L-range circuit 205 through the low inhibit valve 170. As a result, the hydraulic clutch $C_2$ and brakes $B_0$, $B_1$ are connected to the fluid reservoir in the same manner as in the D1-range mode and S1-range mode, the hydraulic clutches $C_0$, $C_1$ are connected to the line-pressure circuit 201, and the hydraulic brake $B_2$ is connected to the line-pressure circuit 201 via the 1-2 shift valve 80, low-coast modulator valve 140, 2-3 shift valve 90, L-range circuit 205 and manual shift valve 10 to establish an L-range circuit, In this instance, the hydraulic clutches $C_0$, $C_1$, $C_2$ and brakes $B_0$, $B_1$, $B_2$ are conditioned as shown at an L1-range mode in FIG. 4. Thus, a first speed gear train is established at the L-range mode of the transmission, and the hydraulic brake $B_2$ is operated to restrain free rotation of the one-way clutch $F_2$ for effecting the engine brake.

When the transmission is in a second speed region at its L-position, the electronic control apparatus ECU acts to energize the solenoid valves $SOL_1$, $SOL_2$ and to deenergize the solenoid valve $SOL_3$. In this instance, the solenoid valves $SOL_1$, $SOL_2$ are closed, while the solenoid valve $SOL_3$ is opened. Thus, the 1-2 shift valve 80, 2-3 shift valve 90 and 3-4 shift valve 100 are shifted in the same manner as in the D2-range mode or S2-range mode. In this instance, the 2-3 shift valve 90 is shifted by the pilot pressure applied to its lower pilot chamber 92 from the L-range circuit 205 through the low inhibit valve 170. Accordingly, the hydraulic clutch $C_1$ and brake $B_1$ are connected to the line-pressure circuit 201 in the same manner as In the D2-range mode or S2-range mode, the hydraulic clutch $C_O$ is connected to the line-pressure circuit 201 through the CO-exhaust valve 150, 3-4 shift valve 100, S-range circuit 204 and manual valve 10, and the hydraulic clutch $C_2$ and brakes $B_0$, $B_2$ are connected to the fluid reservoir in the same manner as in the D2-range mode or S2-range mode thereby to establish an L2-range circuit. In this instance, the hydraulic clutches $C_0$, $C_1$, $C_2$ and brakes $B_0$, $B_1$, $B_2$ are conditioned as shown at an L2-range mode in FIG. 4. This establishes a second speed gear train at the L-range of the transmission M.

When the transmission is in a third speed region at its L-position, the electronic control apparatus ECU acts to energize the solenoid valves $SOL_2$, $SOL_3$ and to deenergize the solenoid valve $SOL_1$. In this instance, the solenoid valves $SOL_2$, $SOL_3$ are closed, while the solenoid valve $SOL_1$ is opened. Thus, the 1-2 shift valve 80 and 3-4 shift valve 100 are shifted by the pilot pressure applied to their pilot chambers 81,101, the low-coast modulator valve 140, orifice control valve 160, low inhibit valve 170 and 2-3 shift timing valve 180 are operated by the pilot pressure applied to their pilot chambers 141,161,171,181, and the lower pilot chamber 92 of 2-3 shift valve 90 is connected to the fluid reservoir through the low inhibit valve 170 to make the 2-3 shift valve 90 inoperative. As a result, the hydraulic brakes $B_0$, $B_1$, $B_2$ are connected to the fluid, reservoir as in the D3-range mode or S3-range mode, and the hydraulic clutches $C_0$, $C_1$, $C_2$ are connected to the line-pressure circuit 201 to establish an L3-range circuit. In this instance, the hydraulic clutches $C_0$, $C_1$, $C_2$ and brakes $B_0$, $B_1$, $B_2$ are conditioned as shown at an L3-range mode in FIG. 4. This establishes a third speed gear train at the L-range mode of the transmission M. When the mode of operation of the transmission is shifted up to the D3-range mode or S3-range mode from the D2-range mode or S2-range mode, the changeover timing of the 2-3 shift timing valve 180 from its inoperative condition to its operative condition is controlled under control of the electronic control apparatus ECU in accordance with the engine torque to adjust the decrease characteristic of the hydraulic pressure in brake $B_1$ as shown by a solid line in FIG. 6. For such control of the 2-3 shift timing valve 80, the electronic control apparatus ECU is programmed to execute a control program shown by a flow chart in FIG. 7.

Figure 5:
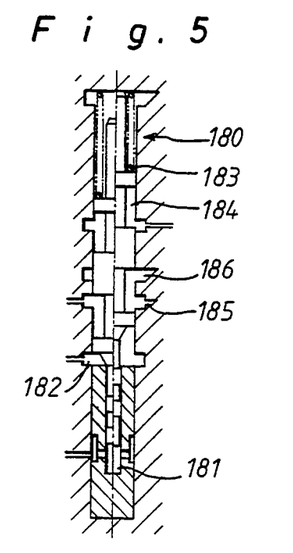
FIG. 5 is an enlarged view of a shift timing valve shown in FIG. 3.
Figure 6:
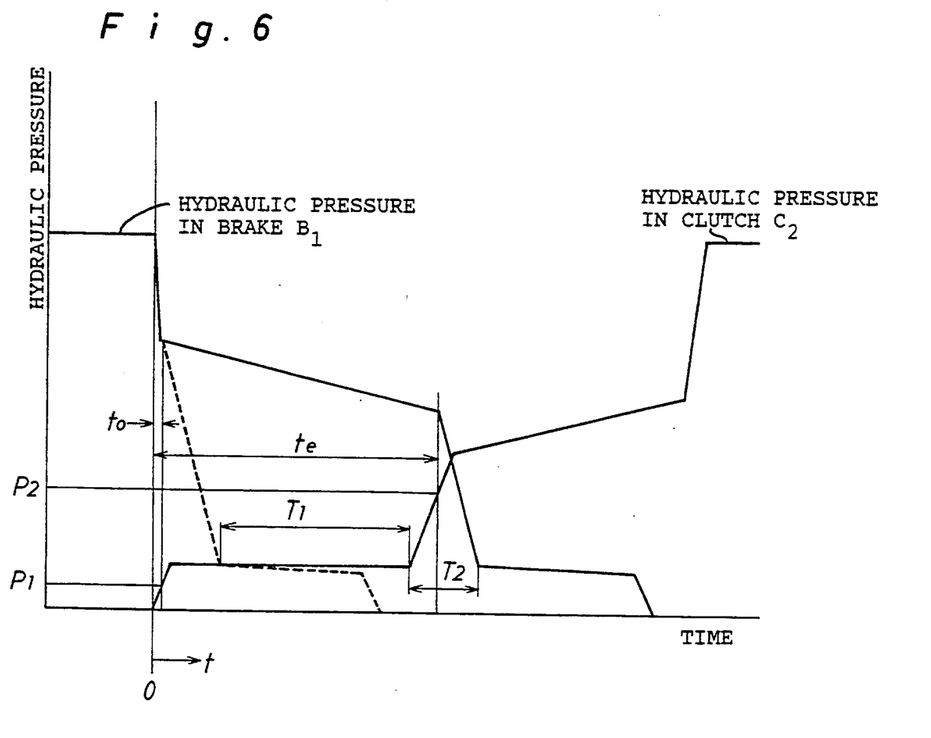
FIG. 6 is a graph showing hydraulic pressure in a brake to be disengaged in shift-up operation of the transmission in relation to hydraulic pressure in a clutch to be engaged in the shift-up operation.

The characteristic line of the hydraulic pressure in brake $B_1$ shown by a broken line in FIG. 6 is effected in a condition where the solenoid valves $SOL_1$ and $SOL_3$ have been deenergized and energized respectively in response to an electric shift signal in shift-up operation of the transmission to apply the hydraulic pressure to the pilot chamber 181 of 2-3 shift timing valve 180. (see FIG. 5) In such a condition, the 2-3 shift valve 90 is switched over from its operative condition to its inoperative condition in response to deenergization of the solenoid valve $SOL_1$ to increase the hydraulic pressure in clutch $C_2$ as shown by a solid line in FIG. 6. When the hydraulic pressure in clutch $C_2$ becomes a value of $P_1$, a resultant force of the hydraulic pressures applied to the pilot chambers 181 and 182 of 2-3 shift timing valve 180 becomes larger than that of the biasing force of return spring 183 and the hydraulic pressure applied to the pilot chamber 184 of 2-3 shift timing valve 180 (or the accumulator back pressure regulated in accordance with the throttle pressure from the throttle valve). Thus, the 2-3 shift timing valve 180 is switched over from its inoperative condition to its operative condition to switch over a slow-drain condition of the fluid under pressure discharged from the hydraulic brake $B_1$ through a drain passage 185 with an orifice in the 2-3 shift timing valve 180 to a quick-drain condition of the fluid under pressure discharged through the drain passage 185 and an additional passage 186 in the 2-3 shift timing valve 180. In this instance, an underlap time while the hydraulic clutch $C_2$ starts to be engaged after disengagement of the hydraulic brake $B_1$ is represented by $T_1$.

On the other hand, the characteristic line of the hydraulic pressure in brake $B_1$ shown by the solid line in FIG. 6 is effected in a condition where the pilot chamber 181 of 2-3 shift timing valve 180 may not be applied with the pilot pressure due to deenergization of the solenoid valve $SOL_3$ in shift-up operation of the transmission. In such a condition, the 2-3 shift valve 90 is switched over from its operative condition to its inoperative condition to increase the hydraulic pressure in clutch $C_2$ as shown in FIG. 6. When the hydraulic pressure in clutch $C_2$ becomes a value of $P_2$, the hydraulic pressure applied to the pilot chamber 182.of 2-3 shift timing valve 180 from the hydraulic clutch $C_2$ becomes larger than a resultant force of return spring 183 of valve 180 and the hydraulic pressure applied to the pilot chamber 184 of valve 180. As a result, the 2-3 shift timing valve 180 is switched over from its inoperative condition to its operative condition to switch over a slow drain condition of the fluid under pressure discharged from the hyraulic brake $B_1$ to a quick drain condition. In this instance, an overlap time while the hydraulic brake $B_1$ is disengaged after start of engagement of the hydraulic clutch $C_2$ is represented by $T_2$.

Figure 7:
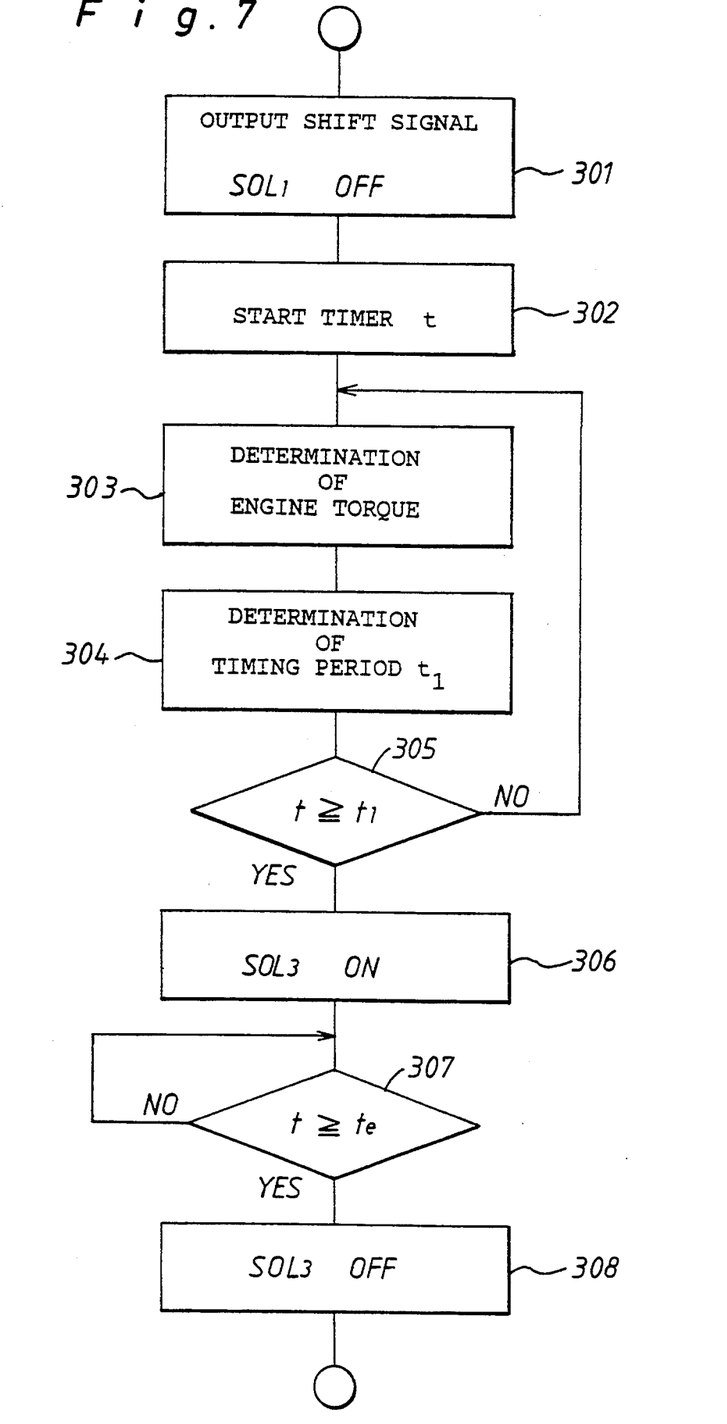
FIG. 7 is a flow chart of a control program executed by the electronic control apparatus shown in FIG. 1.

Hereinafter, with reference to the graph of FIG. 6 and the flow chart of FIG. 7, it will be described how the changeover timing or 2-3 shift timing valve 180 is adjusted in accordance with the engine torque. In operation, the electronic control apparatus ECU is responsive to electric signals from the linear throttle sensor $S_2$ and vehicle speed sensor $S_3$ to determine, on a basis of a change-speed map, the fact that the mode of operation of the transmission has been changed from its second speed region to its third speed region, When the change of the mode of operation is determined, the electronic control apparatus ECU produces an electric shift signal therefrom at step 301 of the program and applies it to the solenoid valve $SOL_1$. Thus, the solenoid valve $SOL_1$ is deenergized in response to the shift signal. When the program proceeds to step 302, an internal timer of the electronic control apparatus ECU starts to measure lapse of a time t. At the following step 303 of the program, the electronic control apparatus ECU is applied with electric signals from the engine rotation sensor $S_1$ and linear throttle sensor $S_2$ to determine magnitude of the engine torque on the basis of an engine torque map of FIG. 8 preliminarily memorized therein. When the program proceeds to step 304, the electronic control apparatus ECU determines a timing period $t_1$ in accordance with the magnitude of the engine torque and the opening degree of the engine throttle represented by an electric signal from the linear throttle sensor $S_2$ on a basis of a timing map of FIG. 9 preliminarily memorized therein.

When the program proceeds to step 305, the electronic control apparatus ECU determines whether or not the lapse of time t is more than or equal to the timing period $t_1$. If the answer at step 305 is "No", the program returns to step 303 where the electronic control apparatus ECU determines the magnitude of the engine torque. If the answer at step 305 is "Yes", the program proceeds to step 306 where the electronic control apparatus ECU produces an output signal for energization of the solenoid $SOL_3$ and causes the program to proceed to step 307. At step 307, the electronic control apparatus; ECU determines whether or not the lapse of time t is more than or equal to a maximum timing period $t_e$. If the answer at step 307 is "No", the electronic control apparatus ECU will repeat the processing at step 307. If the answer at step 307 becomes "Yes", the program proceeds to step 308 where the electronic control apparatus ECU produces an output signal for deenergization of the solenoid valve $SOL_3$.

From the above description, it will be understood that the operation of the 2-3 shift timing valve 180 is controlled by the electronic control apparatus ECU as follows. Assuming that the timing period t1 has been determined as a minimum value $t_0$ when the mode of operation of the transmission was shifted up from the second speed to the third speed, the electronic control apparatus ECU executes the processing at step 306 to energize the solenoid valve SOL3. Thus, the solenoid valve $SOL_3$ is closed to apply the pilot pressure to the pilot chamber 181. When the hydraulic pressure in clutch $C_2$ increases up to the value of $P_1$, the 2-3 shift timing valve 180 is switched over from its slow-drain condition to its quick-drain condition to effect the hydraulic pressure characteristic shown by the broken line in FIG. 6. When the lapse of time t becomes the maximum period $t_e$, the electronic control apparatus ECU executes the processing at step 308 to deenergize the solenoid valve $SOL_3$.

Assuming that the timing period $t_1$ has been determined as a maximum value $t_e$ when the mode of operation of the transmission was shifted up from the second speed to the third speed, the processing at step 306, 307 and 308 is simultaneously executed by the electronic control apparatus ECU when the lapse of time t becomes equal to or more than the maximum value $t_e$. In this instance, the electronic control apparatus ECU does not produce any output signal for energization of the solenoid valve $SOL_3$. As a result, the solenoid valve $SOL_3$ is maintained in its open position so that when the hydraulic pressure in clutch $C_2$ increases up to a value of $P_2$, the 2-3 shift timing valve 180 is switched over from its slow-drain condition to its quick-drain condition to effect the hydraulic pressure characteristic shown by the solid line in FIG. 6.

Figure 8:
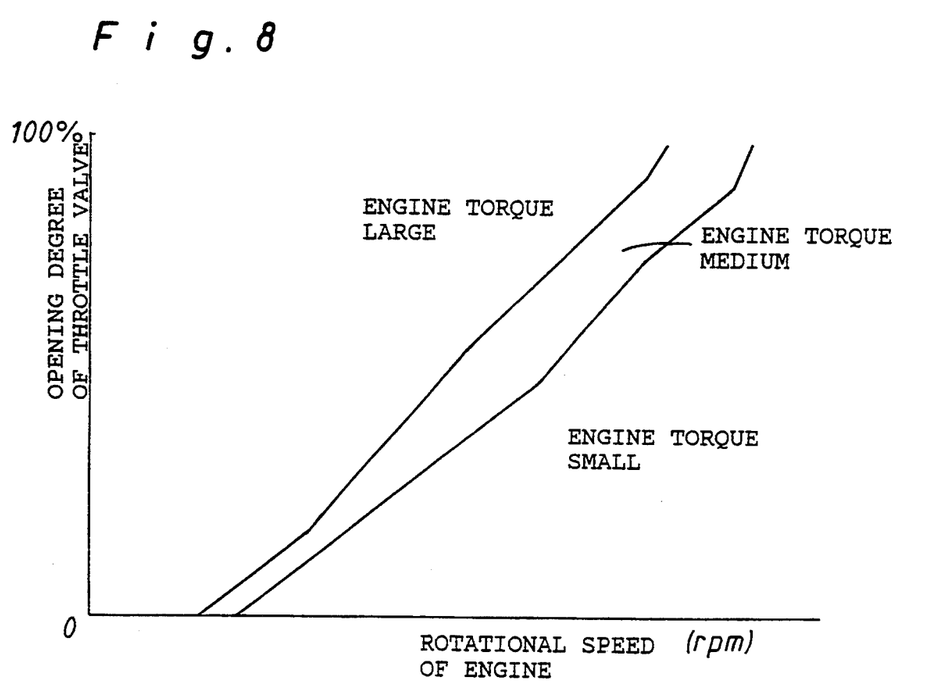
FIG. 8 is a graph showing a drive torque of a vehicle engine in relation to a rotational speed of the vehicle engine and an opening degree of a throttle valve of the vehicle engine.
Figure 9:
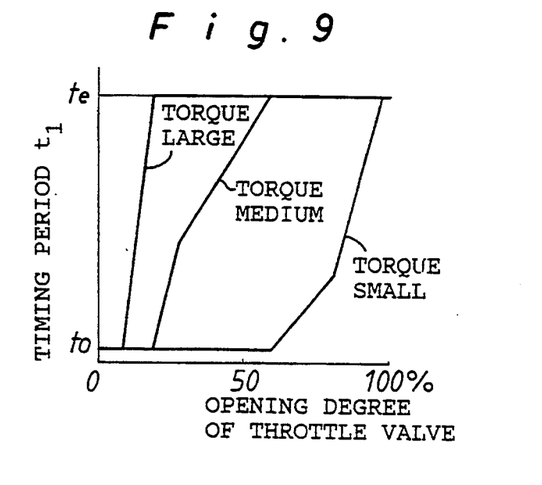
FIG. 9 is a graph showing a timing period in relation to the drive torque of the vehicle engine.
Figure 10:
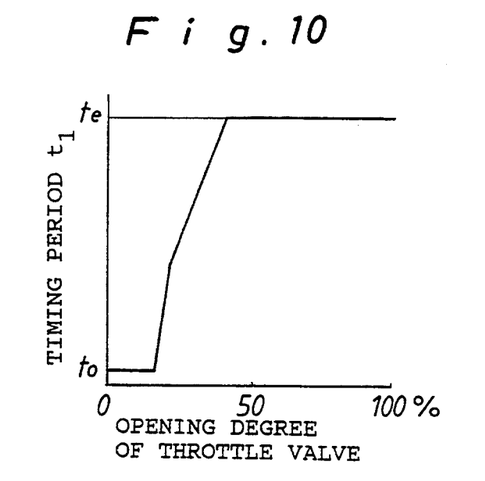
FIG. 10 is a modification of the graph shown in FIG. 9.
Figure 11:
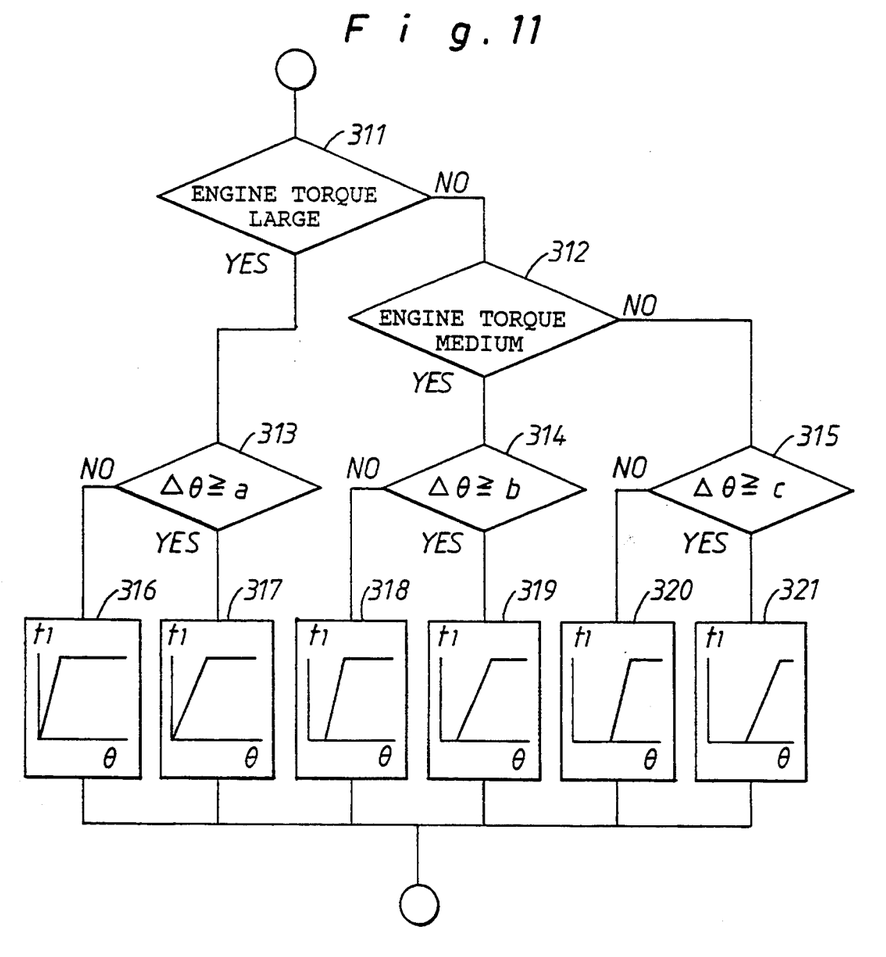
FIG. 11 is a Flow chart of another control program executed by the electronic control apparatus.
Figure 12:
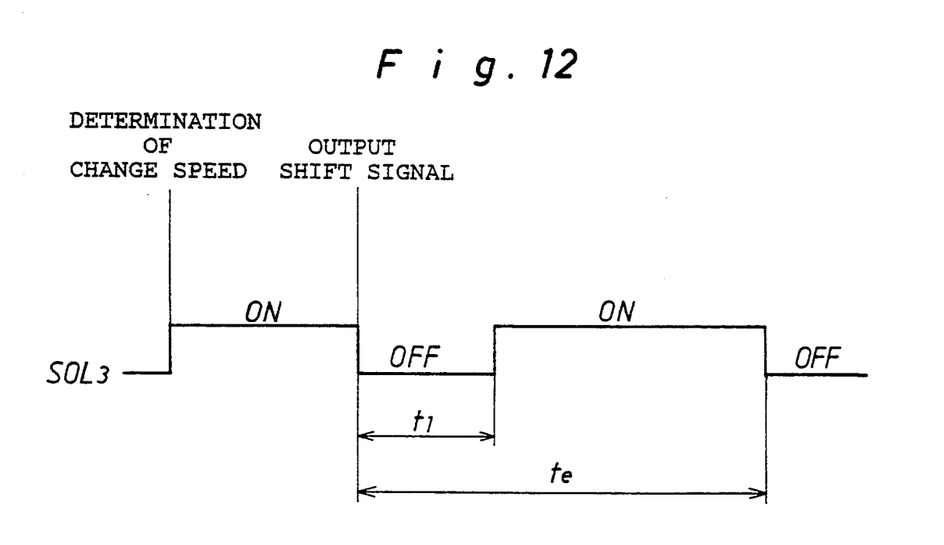
FIG. 12 is a graph showing on-off operation of a solenoid valve in shift-up operation of the transmission.

Although in the embodiment described above the timing period $t_1$ has been determined on a basis of the timing map of FIG. 9 at step 304 of the program after determination of the magnitude of the engine torque based on the engine torque map of FIG. 8 at step 303 of the program, the timing period $t_1$ may be determined on a basis of a timing map shown in FIG. 10 at step 304 without the processing at step 303 of the program. Furthermore, the processing at step 303 and 304 of the program may be replaced with processing at step 311-321 of a program shown in FIG. 11. In this case, the electric control apparatus is programmed to determine at step 311 and 312 the magnitude of the engine torque on a basis of the engine torque map of FIG. 8, to determine at step 313-315 whether or not a return amount or speed $\Delta\theta$ of the engine throttle is more than a predetermined value a, b or c and to determine at step 316-321 a timing period $t_1$ in accordance with the opening degree $\theta$ of the engine throttle on a basis of each timing map. Although in the embodiment described above the solenoid valve $SOL_3$ has been energized upon lapse of the predetermined time $t_1$ in shift-up operation of the transmission, the operation of the solenoid valve $SOL_3$ may be controlled as shown in FIG. 12 if the rise of the pilot pressure caused by energization of the solenoid valve $SOL_3$ is slow. In such a control as shown in FIG. 12, the electronic control apparatus ECU is programmed to energize the solenoid valve $SOL_3$ prior to issuance of the shift signal when determined on a basis of the change-speed map the fact that the mode of operation of the transmission approached the third speed region from the second speed region and to deenergize the solenoid valves $SOL_1$, $SOL_3$ when issued the shift signal therefrom.

Assuming that the manual shift valve 10 has been shifted by operation of the shift lever 11 from the D-range to the L-range in a condition where the transmission is maintained at the fourth speed mode in its D-position during travel of the vehicle at a higher speed than a predetermined speed, the electronic control apparatus ECU produces an electric shift signal for change to the third speed mode, and the low inhibit valve 170 is maintained in connection to the fluid reservoir to disconnect the lower pilot chamber 92 of 2-3 shift valve 90 from the L-range circuit 205. Thus, the line-pressure circuit 201 is connected to the L-range circuit 205 by means of the manual shift valve 10, and the 2-3 shift valve 90 is maintained in its inoperative condition so that the hydraulic clutch $C_2$ is supplied with the fluid under pressure from the D-range circuit 203 to maintain the transmission at its high speed mode. This is useful to prevent the transmission from being shifted down to the second speed mode and to eliminate unpleasant shock in speed reduction and overrun of the engine. Assuming that the manual shift valve 10 has been shifted by operation of the shift lever 11 from the D-range to the L-range in a condition where the transmission is maintained at its third speed mode in its D-position during travel of the vehicle at a higher speed than a predetermined speed, the electronic control apparatus ECU produces an electric shift signal for change to the third speed mode to maintain the transmission at its third speed mode.

When the manual shift valve 10 has been shifted by operation of the shift lever 11 from the D-range to the L-range in a condition where the transmission is maintained at the fourth or third speed mode in its D-position during travel of the vehicle at a lower speed than the predetermined speed, the electronic control apparatus ECU produces a shift signal for the second speed mode, and in turn, the low inhibit valve 170 is switched over from its operative condition to its inoperative condition to connect the lower pilot chamber 92 of 2-3 shift valve 90 to the L-range circuit 205. In this instance, the line-pressure circuit 201 is connected to the L-range circuit 205 by means of the manual shift valve 10, and the 2-3 shift valve 90 is maintained in its operative condition to permit discharge of the fluid under pressure from the hydraulid clutch $C_2$ thereby to switch over the transmission to the first or second speed mode. Thus, even if the transmission was shifted down from the fourth or third speed mode to the second speed mode during travel of the vehicle at a low speed, there would not occur unpleasant shock in speed reduction and overrun of the engine.

In a condition where the transmission is maintained at the fourth speed mode in its D-position, the solenoid valves $SOL_1$, $SOL_2$ are deenergized while the solenoid valve $SOL_3$ is energized Thus, the low inhibit valve 170 is operated to disconnect the lower pilot chamber 92 of 2-3 shift valve 90 from the L-range circuit 205 and connect it to the fluid reservoir. Accordingly, even if the position sensor $S_4$ fails to detect the shifting operation of lever 11 to the L-position, the electronic control apparatus ECU will continue to produce the shift signal for the fourth speed mode thereby to maintain the solenoid valves $SOL_1$, $SOL_2$ in their deenergized conditions and maintain the solenoid valve $SOL_3$ in its energized condition. Thus, the line-pressure circuit 201 is maintained in connection to the L-range circuit 205 by means of the manual valve 10, and the 2-3 shift valve 90 is maintained in its inoperative condition under control of the low inhibit valve 170. Accordingly, even if the transmission is shifted down to the third speed mode, the engine will be prevent from overrun.

If the solenoid valve $SOL_3$ is deenergized in a condition where the transmission is maintained at the fourth speed mode in its D-position, the low inhibit valve 170 becomes inoperative to connect the lower pilot chamber 92 of 2-3 shift valve 90 to the L-range circuit 205. In this instance, if the shift lever 11 is shifted to the L-position under failure of the position sensor $S_4$, the manual shift valve 10 is positioned to connect the line-pressure circuit 201 to the the L-range circuit 205. Thus, the 2-3 shift valve 90 is switched over by the hydraulic pressure applied to its lower pilot chamber 92 from the line-pressure circuit 201 to provide a circuit equivalent to the L-range circuit. This causes the transmission to shift down from the fourth speed mode to the first speed mode.

What is claimed is:

1. A control apparatus for an automatic transmission having a set of frictional engagement elements arranged to be selectively engaged or disengaged in shift-up operation of the transmission, a shift timing valve arranged to be switched over by hydraulic pilot pressure applied thereto for switching over discharge of fluid under pressure from one of said frictional engagement elements to be disengaged in the shift-up operation from a slow-drain condition to a quick-drain condition, and a solenoid valve arranged to interrupt the hydraulic pilot pressure applied to the shift timing valve when maintained in a deenergized condition and to permit the hydraulic pilot pressure to be applied to the shift timing valve when energized, comprising:

detection means for detecting a drive torque of a vehicle engine;
 means for determining a timing period for energization of said solenoid valve in the shift-up operation in accordance with the drive torque of the vehicle engine detected by said detection means; and
 control means for maintaining said solenoid valve in its deenergized condition during the timing period and for energizing said solenoid valve upon lapse of the timing period.

2. A control apparatus for an automatic transmission as claimed in claim 1, wherein said detection means comprises means for detecting an opening degree of a throttle valve of the vehicle engine means for detecting a rotational speed of the vehicle engine, and means for detecting a drive torque of the vehicle engine based on a relationship of the rotational speed of said vehicle engine and the opening degree of said throttle valve.

3. A control apparatus for an automatic transmission having a set of frictional engagement elements arranged to be selectively engaged or disengaged in shift-up operation of the transmission, a shift liming valve arranged to be switched over by hydraulic pilot pressure applied thereto for switching over discharge of fluid under pressure from one of said frictional engagement elements to be disengaged in the shift-up operation from a slow-drain condition to a quick-drain condition, and a solenoid valve arranged to interrupt the hydraulic pilot pressure applied to the shift timing valve when maintained in a deenergized condition and to permit the hydraulic pilot pressure to be applied to the shift timing valve when energized, comprising:

first detection means for detecting an opening degree of a throttle of a vehicle engine;
 second detection means for detecting a rotational speed of the vehicle engine;
 third detection means for detecting a drive torque of the vehicle engine based on a relationship of the rotational speed of the vehicle engine and the opening degree of said throttle valve;
 means for determining a timing period for energization of said solenoid valve in the shift-up operation in relation to the opening degree of said throttle valve detected by said first detection means :and in consideration of the drive torque of the vehicle engine detected by said third detection means; and
 control means for maintaining said solenoid valve in its deenergized condition during said timing period and for energizing said solenoid valve upon lapse of said timing period.

4. A control apparatus for an automatic transmission having a set of frictional engagement elements arranged to be selectively engaged or disengaged in shift-up operation of the transmission, a shift timing valve arranged to be switched over by hydraulic pilot pressure applied thereto for switching over discharge of fluid under pressure from one of said frictional engagement elements to be disengaged in the shift-up operation from a slow-drain condition to a quick-drain condition, and a solenoid valve arranged to interrupt the hydraulic pilot pressure applied to the shift timing valve when maintained in a deenergized condition and to permit the hydraulic pilot pressure to be applied to the shift timing valve when energized, comprising:

detection means for detecting an opening degree of a throttle of a vehicle engine:
 means for determining a timing period for energization of said solenoid valve in the shift-up operation in relation to the opening degree of said throttle valve detected by said detection means; and
 control means for maintaining said solenoid valve in its deenergized condition during said timing period and for energizing said solenoid valve upon lapse of said timing period.

5. A control apparatus for an automatic transmission having a set of frictional engagement elements arranged to be selectively engaged or disengaged in shift-up operation of the transmission, a shift timing valve arranged to be switched over by hydraulic pilot pressure applied thereto for switching over discharge of fluid under pressure from one of said frictional, engagement elements to be disengaged in the shift-up operation from a slow-drain condition to a quick-drain condition, and a solenoid valve arranged to interrupt the hydraulic pilot pressure applied to the shift timing valve when maintained in a deenergized and to permit the hydraulic pilot pressure to be applied to the shift timing valve when energized, comprising:

first detection means for detecting an opening degree of a throttle of a vehicle engine;

second detection means for detecting a drive torque of the vehicle engine;

means for determining a timing period for energization of said solenoid valve in the shift-up operation in accordance with the drive torque of the vehicle engine detected by said first detection means and the opening degree of said throttle detected by said second detection means; and control means for maintaining said solenoid valve in its deenergized condition during said timing period and for energizing said solenoid valve upon lapse of said timing period.

* * * * *